United States Patent [19]

Korsak

[11] 4,170,437
[45] Oct. 9, 1979

[54] HELICOPTER PRIMARY FLIGHT CONTROLS

[76] Inventor: Kazimierz Korsak, 827 Tamlei Ave., Thousand Oaks, Calif. 91360

[21] Appl. No.: 660,643

[22] Filed: Feb. 23, 1976

[51] Int. Cl.² .......................................... B64C 27/80
[52] U.S. Cl. ................................ 416/130; 416/170 R
[58] Field of Search ............. 416/130, 121, 102, 148, 416/125, 129, 115, 170; 74/665 F, 665 G, 200, 201, 665 K, 690, 691; 244/17.11, 17.23, 17.25, 69

[56] References Cited

U.S. PATENT DOCUMENTS

| | | | |
|---|---|---|---|
| 2,037,745 | 4/1936 | Vaughn | 416/129 X |
| 2,228,638 | 1/1941 | Mercier | 416/130 X |
| 2,596,363 | 5/1952 | Breguet | 74/665 K |
| 2,838,123 | 6/1958 | Olcott | 416/129 X |
| 2,936,971 | 5/1960 | Holmes | 244/17.23 X |
| 3,188,884 | 6/1965 | Bancroft | 74/665 K |
| 3,252,355 | 5/1966 | Hewko | 74/665 K |
| 3,263,523 | 8/1966 | Nash | 74/665 G |
| 3,448,810 | 6/1969 | Vogt | 416/129 X |
| 3,450,208 | 6/1969 | Barton | 416/129 X |
| 3,475,993 | 11/1969 | Hewko | 74/665 K X |
| 3,581,587 | 6/1971 | Dickenbrock | 74/200 |
| 3,669,564 | 6/1972 | Garfinkle | 416/129 X |
| 3,739,658 | 6/1973 | Scheiter | 74/691 X |
| 3,955,432 | 5/1976 | Kemper | 74/201 |

FOREIGN PATENT DOCUMENTS

| | | | |
|---|---|---|---|
| 449076 | 6/1948 | Canada | 244/17.23 |
| 172026 | 7/1960 | Sweden | 244/17.23 |
| 612189 | 11/1948 | United Kingdom | 416/102 |
| 1393984 | 5/1975 | United Kingdom | 416/130 |

*Primary Examiner*—Everette A. Powell, Jr.
*Attorney, Agent, or Firm*—Kazimierz Korsak

[57] ABSTRACT

Yaw control device for helicopters with contra-rotating rotors which controls the anti-torque action of the rotors on the helicopter fuselage by means of a variable speed reduction ratio drive transmission comprising a differential traction drive. At one setting of the yaw controls the rotor torques are balanced by means of the differential in which the input shaft drives a planet carrier and the output shafts are driven by traction discs.

The yaw control is accomplished by means of tilting the axes of rotation of the planets thus changing the effective radia of driving the discs which upsets the rotor torques equilibrium. In a stabilized flight of the helicopter the rotations of the planets on their carrier is practically nil, hence the power loss due to the use of the traction drive is small.

1 Claim, 2 Drawing Figures

HELICOPTER PRIMARY FLIGHT CONTROLS

BACKGROUND OF THE INVENTION

The contra-rotating rotors type helicopters sometimes erroneously are considered to be free from anti-torque action of the rotors on the helicopter fuselage while in the reality, due to the aerodynamic interferences between the rotors in various regimes of flights, the balance between the driving torques of the rotors is being upset, calling for the need of automatic yaw stabilization.

Several concepts for the yaw control of such helicopters have been devised, such as those covered by patents issued to Maillard, Huvers, Garfinkle, Korsak etc. (see References). All of these concepts can provide the balance of driving torques of contra-rotating rotors by means of some kind of a differential gearing, however their problems is that for the helicopter yaw control, to upset the torque equilibrium, these concepts require other devices, such as fluid motor/pumps or electric motor/generators or brakes etc. which add to the complexity of the yaw control systems.

SUMMARY

The object of the invention is to reduce the complexity and to improve the performance of the yaw control of the helicopters with contra-rotating rotors. Specifically the object is to use the principle of balancing the driving torques by means of a differential being the part of a rotor drive transmission, and to use the same differential for unbalancing the rotor drive torques for the yaw control.

The configuration of the rotor drive transmission according to the invention accomplishes just that. In this transmission the input shaft drives a planet carrier of the differential, the output shafts are driven by toroidal discs and the planets, having the shape of rollers, are engaged with the toroidal discs by friction. These planets, being rotatably connected with the carrier, balance the tangential forces, acting at the points of contracts of the planets with the discs. The axes of rotation of the planets are tiltable on the carrier by means of a yaw control mechanism. There is one setting of the controls at which the torques, driving both rotors (in opposite directions), are balanced. By means of moving the controls in one direction or the other from the balance position this balance can be upset causing the helicopter to yaw in one direction or the other.

The above described transmission uses the traction drive principle, known in applications of variable speed reduction drives such as those covered by patents issued to Dickenbrock, Kemper and Scheiter.

All known drives of this category have rollers transmitting full driving power from the input to the output shafts by means of rolling. Due to the slippage during rolling action these drives have low power transfer efficiency. However this does not apply to the same degree to the transmission in which the planets roll on the discs only to reset the balance of the rotor driving torques, and not to transmit the power by means of rolling. Hence in this case the power losses can be minimized by proper selection of speed reduction ratios in the drive trains of the transmission, resulting in a mimimum rolling of planets for the torque balancing.

DESCRIPTION OF THE PREFERRED EMBODIMENT

Figures 1, 2:
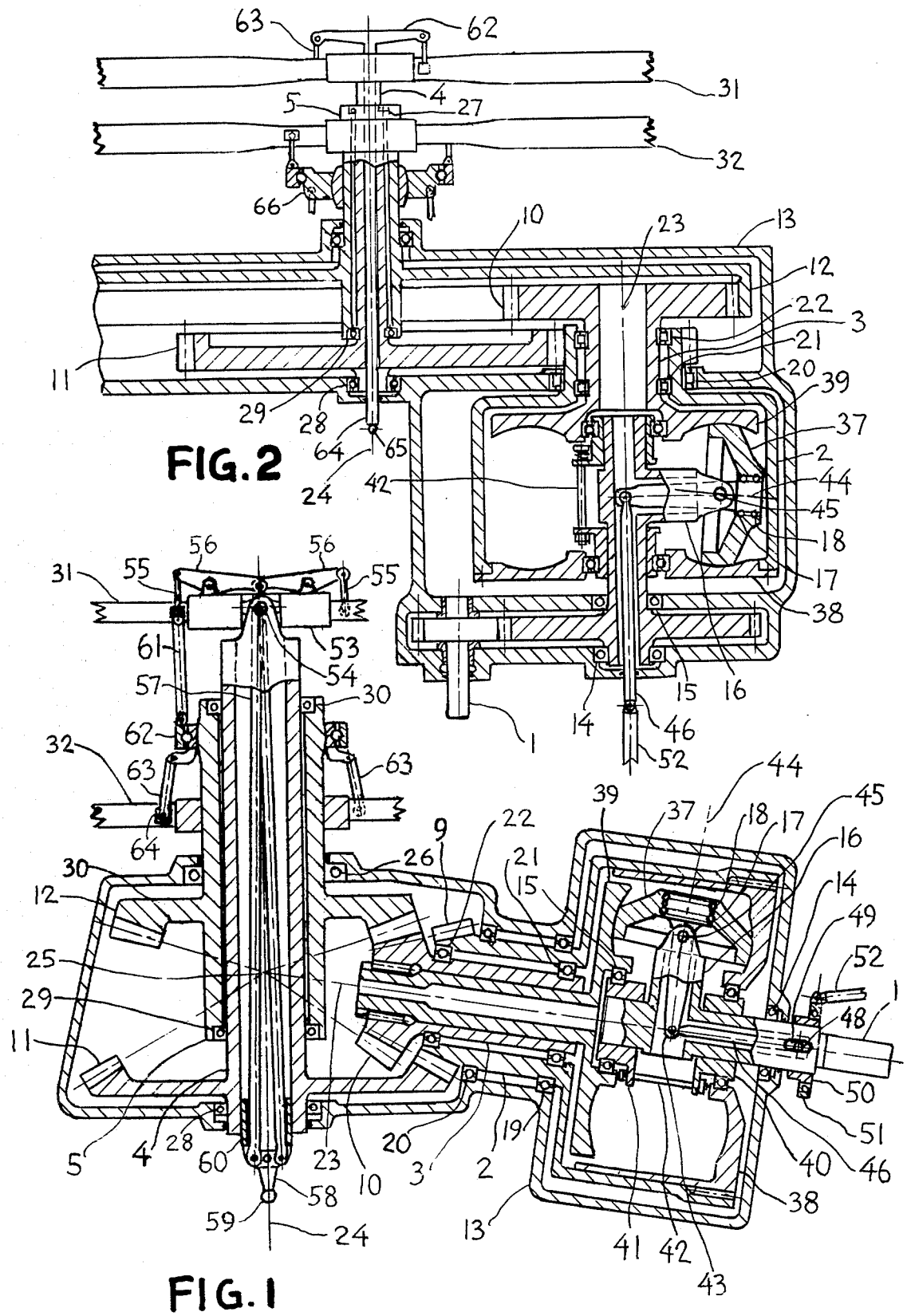
FIG. 1 shows a cross section of transmission for driving contra-rotating rotors of a helicopter, with drive input shaft situated more or less horizontally.
FIG. 2 shows another variant of such transmission with drive input shaft situated more or less vertically.

Referring to FIG. 1, shafts 1, 2 and 3 are interconnected using toroidal discs 38 and 39, planets 37, tilt control levers 43 and planet carrier 16 which is shown to be integral with shaft 1.

While only one planet 37 is shown, there may be as many of them as required, all supported by planet carrier 16, via tilt control levers 43.

Shaft 2 is supported by bearings 19 and 20 in housing 13, and it is splined with toroidal disc 38.

Shaft 3 is supported by bearings 21 and 22 in shaft 2, and it is splined with toroidal disc 39.

Input shaft 1 is supported by bearing 14 in housing 13, and by bearing 15 in toroidal disc 39.

Tilt control levers 43 are all hinged with planet carrier 16 by means of pins 45.

Planets 37 are all supported by their respective tilt control levers 43 using bearings 17 and 18, and they are engaged with toroidal discs 38 and 39 by friction due to a preload by means of a springloaded tension rod 42 which tends to bring said toroidal discs towards each other via sliding flanged bushings 40 and 41.

Bevel gear 9 is afixed to shaft 2, and bevel gear 10 is afixed to shaft 3.

There may be as many input shafts 1 as desired. Their axes of rotation 23 all from identical angles with axis 24, and they all converge into common apex 25.

Associated with each input shaft there are also sets of shafts 2 and 3, toroidal discs 38 and 39, planets 37, tilt control levers 43, planet carriers 16 and gears 9 and 10. All gears 9 engage gear 11 of inner vertical shaft 4, and all gears 10 engage gear 12 of outer vertical shaft 5.

Shafts 4 and 5 support and drive rotors 31 and 32 respectively and they are held co-axially by bearings 29 and 30, and are supported by bearings 26 and 28 in housing 13.

The helicopter yaw control parts comprise a push-pull rod 46 which is connected with tilt control levers 43, and it is operatable by push-pull rod 52 via a slip ring set consisting of a pin 48 which passes through a slot 49 in shaft 1, and of slip rings 50 and 51 which are rotatable with respect to each other.

There is a certain ratio of operating pitch diameters of toroidal discs 38 and 39 at which the torques driving the rotors are in balance, hence there is no anti-torque action on the helicopter fuselage. For this condition the yaw controls are set to hold the tilt of planet axes of rotation 44 at neutral position.

The yaw control movements in either direction from the neutral position change the tilt of planet axes 44, thus changing the operating pitch diameters ratio of toroidal discs 38 and 39 which in turn upsets the torque balance thus introducing the anti-torque of magnitude desired for the yaw control in one direction or the other, depending on the direction of the control movement.

While this invention relates only to yaw control, the collective and cyclic controls of both rotors are shown for reference only to emphasize that the transmission lends itself to accomodation of the rotor blades pitch controls. On this Figure the lower rotor is hingeless and the upper one is of the tittering type. The rotor controls are arranged to pass more or less concentrically with the rotor drive shafts. Control lever 58 hinged on slider 60 via push-pull rods operates levers 56 which control pitch arms of blades 31 of the upper rotor via pitch links 55. Pitch of blades 32 of the lower rotor are controlled via swashplate 62 which is linked with pitch arm of blades 31 by control rods 61. The swashplate 62 operates pitch arms 64 by means of pitch links 63. All control inputs, collective and cyclic, are applied to ball end 59 of lever 58.

Referring to FIG. 2, elements 1 to 52 perform the same functions as the elements identified by the same numbers on FIG. 1. The difference is here that the input drive axis 23 is parallel to the vertical axis of rotor drive shafts 24. This arrangement can be used only when the helicopter engine permits it which not always is the case.

It allows to replace bevel gears 9, 10, 11 and 12 on FIG. 1 by spur or helical gears, one of which is to be with internal teeth.

Another difference is here which may not exist that an additional set of speed reduction gears is added at the input, to show that this addition opens the access for a more direct yaw control which simplifies the control linkage.

On this Figure the upper rotor is shown to have only the collective blade pitch control. Spider 62 operates pitch links 63, and together with its push-pull rod 64 it rotates with shaft 4. The control inputs are applied to ball 65 of rod 64.

The lower rotor is shown to have full collective and cyclic blade pitch controls, applied using swashplate 66.

I claim:

1. In a helicopter equipped with a pair of lifting rotors with adjustable blades, and adjustment means thereof, and having a common axis of rotation, said rotors being connected to power means including a transmission for driving said rotors in opposite directions, said transmission including a traction drive differential means, comprising a pair of toroidal discs with one of said discs being connected to one rotor and the other one to the other rotor, both said discs preloaded by spring means against each other to frictionally engage them with planets of said differential means, each of said planets rotatably connected to a tilt control lever, all of said levers hingedly connected to a planet carrier, said carrier connected to and being driven by an input shaft of said transmission; in combination said transmission also including means for controlling said helicopter in yaw which is being accomplished by monitoring the antitorque action of said rotors on said helicopter, effected through a variation of operating pitch diameters of said toroidal discs as a result of changing positions of tilt control levers, using a push-pull rod operatable via a slip-ring by the helicopter yaw flight control means.

* * * * *